United States Patent [19]
Parker

[11] 3,919,998
[45] Nov. 18, 1975

[54] CONVECTION-TYPE SOLAR HEATING UNIT

[76] Inventor: Louis W. Parker, 2408 Sunrise Key Blvd., Fort Lauderdale, Fla. 33304

[22] Filed: Apr. 23, 1975

[21] Appl. No.: 570,883

[52] U.S. Cl. ................. 126/270; 126/271; 237/1 A
[51] Int. Cl.² ............................................ F24J 3/02
[58] Field of Search ............. 126/270, 271; 237/1 A

[56] References Cited
UNITED STATES PATENTS

| | | | |
|---|---|---|---|
| 1,814,897 | 7/1931 | Coxe .................................. | 126/270 |
| 1,951,403 | 3/1934 | Goddard ............................. | 126/271 |
| 2,553,073 | 5/1951 | Barnett .............................. | 126/271 |
| 2,680,437 | 6/1954 | Miller ................................ | 126/270 |

*Primary Examiner*—Kenneth W. Sprague
*Attorney, Agent, or Firm*—Elliott I. Pollock

[57] ABSTRACT

A solar heater comprises a plurality of elongated containers which are nested within one another, each container having a transparent upper surface positioned to admit solar radiation to the container. Each container includes an inlet adjacent one end thereof for the admission of a gaseous medium, such as air or some other gas such as carbon dioxide, to be heated by solar radiation within the container, and further includes an outlet for the heated gaseous medium adjacent its other end. The gas outlet of each container is connected to the inlet of the next inner one of the nested containers, and the outlet of the innermost container is connected to the inlet of the outermost container, so that the gaseous medium flows continuously to and through each of the nested containers to cause the medium to be heated to successively higher temperatures as it flows through said containers in succession. The innermost container includes a thermocouple junction, or a boiler containing water for conversion to steam by the heated gaseous medium. Plural nested-container units can be arranged in series with one another, with the respective boilers of said plural units also being connected in series, to increase the efficiency of the device.

17 Claims, 2 Drawing Figures

CONVECTION-TYPE SOLAR HEATING UNIT

BACKGROUND OF THE INVENTION

Various forms of solar heating arrangements have been suggested heretofore in an effort to use energy from the sun as a source of heat. In its simplest form, such an arrangement constitutes the judicious disposition and orientation of transparent surfaces arranged to admit electromagnetic radiation emanating from the sun to an interior region which, preferably, includes an appropriate medium responsive to such radiation. The medium typically employed heretofore has been water or a comparatively low boiling point liquid, which functions to absorb solar heat, and which is so arranged that the heat absorbed in the water or liquid can be extracted therefrom for utilization as desired. Arrangements of this type are described, for example, in the U.S. Pats. to McHenry, No. 659,560, Baker, No. 695,136, Sherock, No. 3,250,269, Snelling, No. 3,390,672, Masters, No. 3,513,828, and Kyryluk, No. 3,514,942.

In general, in arrangements of the type discussed above, it has not been considered feasible to employ air or some other gas as the medium which is directly heated by solar radiation. In this respect, therefore, the present invention constitutes a departure from arrangements suggested heretofore in that it provides a solar heating structure which makes it feasible to use air or some other gas as the medium to be heated by solar energy.

The overall efficiency of a solar heating system is measured by the heat units obtainable per unit of time and per dollar invested instead, as is customary in other types of energy conversion systems, by the ratio of heat obtainable to useful heat received. Low efficiency calculated on this latter basis is quite permissible in a solar heater due to the fact that a great abundance of low level free energy is obtainable from the sun. In evaluating the comparative efficiencies of solar heating systems, therefore, the most practical system thus becomes one that generates the greatest useful energy output per dollar invested.

The present invention is accordingly further intended to provide a solar heating system which has greater efficiency than other solar heaters suggested heretofore, in that it operates to concentrate electro-magnetic ratiation emanating from the sun and derive practical benefits from the concentrated energy in an arrangement which makes use throughout of comparatively inexpensive components such as wood, plastic, or the like, without use of more expensive components which have often been utilized heretofore such as reflecting mirrors or refractive media. The approved efficiency in this respect is achieved, moreover, by an arrangement which not only employs a gas as the medium heated by solar energy, but which effects movement of the gaseous medium through the heater automatically by convection, thus permitting the elimination of mechanisms such as a mechanically operated blower which would require additional energy for operation and which would, moreover, increase the cost of the solar heating unit.

SUMMARY OF THE INVENTION

The solar heater of the present invention comprises a plurality of elongated containers each of which is fabricated of a comparatively inexpensive heat insulating material such as wood, plastic or the like, and each of which has one side thereof covered by a transparent element fabricated of glass, cellophane or the like, to admit solar radiation to the interior of the containers. The several containers are nested one within the other with their respective transparent covers being superposed and positioned to admit solar radiation to all of the containers, and each container includes, on its interior, one or more black body elements taking the form, for example, of a plurality of blackened vanes mounted for movement within the container to permit appropriate orientation of said vanes relative to the incoming solar energy, whereby the black body elements within each container are heated by the incoming solar radiation.

The several nested containers are interconnected to one another by gas flow passageways which are so arranged that a gaseous medium is caused to flow by convection continuously through said containers past the black body elements therein for heating by solar radiation admitted through the transparent cover of each container and by picking up additional heat from the black body elements within the container. More particularly, each of the elongated nested containers includes a gas inlet at one end thereof and a gas outlet at its other end, and the aforementioned gas flow passageways connect the outlet of each container to the inlet of the next inner one of said containers, and connect the outlet from the innermost one of said containers to the inlet of the outermost one of said containers, whereby the gaseous medium, e.g., air, carbon dioxide or the like, flows continuously to and through each of the said nested containers in succession from the outermost container to the innermost container to cause said gaseous medium to be heated to successively higher temperatures as it flows through said successive inwardly disposed containers. The innermost container includes heat utilization means which is responsive to the comparatively high temperature heated gaseous medium flowing through the innermost container, and the heat utilization means can comprise, for example, a boiler containing water which is converted to steam by the heated gaseous medium flowing through the innermost container, or it can comprise one junction of a thermocouple responsive to said heated gaseous medium for generating electrical energy.

An apparatus constructed in accordance with the present invention has been found to generate temperatures in the order of 250°F at the innermost container. Since the air or other gaseous medium employed exhibits considerable expansion as its temperature is raised, and since the actual temperature achieved may vary from minute to minute due to variations in incoming solar energy with a resultant almost constant variation in the pressure of the medium, the solar heater is provided with a mechanism, e.g., spring bias valves and/or an expansible bellows, which operates to eliminate any significant variation in the pressure of the flowing gaseous medium and which keeps that pressure within the containers at a value substantially equal to the ambient pressure outside the containers, thereby eliminating the need and consequent expense of containers fabricated to resist the considerable gas pressures which would otherwise be produced.

To increase the efficiency of the overall system further, plural groups of nested containers of the type described can be connected in series with one another so that the flowing gaseous medium, after passing through the containers of one group from the outermost to the innermost container thereof, then passes to a further group of nested containers and flows from the outermost to the innermost container of said further group before being returned to the outermost container of the first group. When the heat utilization means employed in the innermost container takes the form of a steam boiler, moreover, the efficiency of the overall unit may be further increased by extracting heat from the gaseous medium emerging from the outlet of the innermost container in a preheater which operates to raise the temperature of the water being supplied to the boiler. The output of the heater can be used in any well known fashion and, when said output comprises steam, can be used for example to operate a steam turbine which in turn drives an electrical generator.

BRIEF DESCRIPTION OF THE DRAWINGS

The foregoing objects, advantages, construction and operation of the present invention will become more readily apparent from the following description and accompanying drawings in which.

DESCRIPTION OF THE PREFERRED EMBODIMENTS

Figure 1:
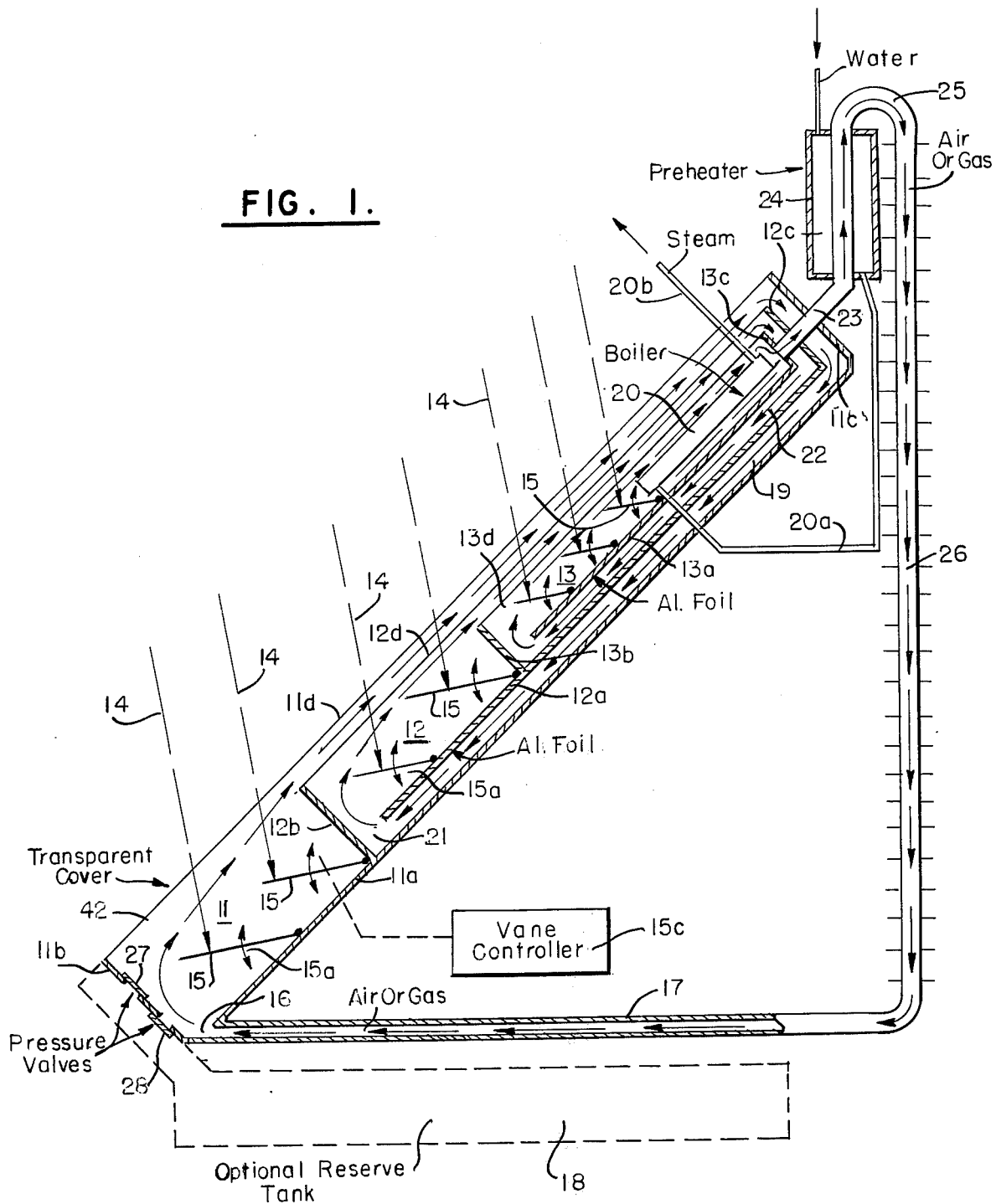
FIG. 1 is a cross-sectional diagrammatic view of a solar heater constructed in accordance with the present invention.

FIG. 1 depicts a solar heater constructed in accordance with the present invention which consists of three nested containers 11, 12 and 13 disposed one within the other and interconnected to one another for the continual transfer of a gaseous medium from the outermost container 11 to the innermost container 13 and thence back to the outermost container 11. While three such containers are shown in FIG. 1, it will be appreciated that a different number of containers may be used in accordance with the present invention. Each container is, in cross section, of elongated rectangular configuration, but it will be further appreciated that variations in the shapes of the containers may also be made without departing from the principles of the present invention. In general, it is desirable that the containers be fabricated of comparatively inexpensive materials exhibiting heat insulating properties such as the materials earlier discussed, to minimize the cost of the heater and thereby increase its efficiency from a solar heating point of view.

The outermost container 11 comprises an opaque bottom wall 11a, a lower end wall 11b, an upper end wall 11c and a transparent cover 11d. The next inner container 12 similarly comprises opaque bottom wall 12a, lower end wall 12b, upper end wall 12c, and transparent cover 12d; and the innermost container 13 similarly comprises corresponding container portions 13a–13d inclusive. The several transparent covers 11d, 12d, and 13d are superposed in the fashion illustrated to admit solar radiation 14 to each of the nested boxes or containers 11–13. The object to be heated, which comprises a boiler 20 in the form of the invention shown in FIG. 1 (but which may comprise alternative heat utilization means such as the "hot" junction of a thermocouple), is appropriately located or otherwise mounted within the innermost box 13.

The concept of placing several containers within one another has been used before, but it was found that the outer containers in the prior arrangements do not deliver heat to the innermost container, just insulate it. The reason for this is that the temperature of the air in the outer containers is lower than in the innermost container. Since heat travels from higher to lower temperature, it can only travel outward from the innermost container.

In contrast, the novel concept embodied in the present invention is that air or some other gaseous medium is first heated to a higher temperature than is in the innermost container, and then delivered to that container. This is accomplished by moving the gaseous medium through several containers located within one another and heating it with black metal buffers exposed to solar radiation as will be described. After this, the heated gaseous medium enters the innermost container containing the heat absorbing element which is also exposed to solar radiation. The temperature of the gaseous medium in this innermost container is somewhat lower than the entering air temperature due to the steady removal of heat by the heat absorber 20. Consequently, the entering hot air or gaseous medium delivers heat to the heat absorber and makes it impossible for that absorber to lose heat it has received by direct radiation to the surrounding air by conduction. Because of the temperature gradient which exists from one to the next of the several boxes 11–13, the gaseous medium can, through the provision of appropriate gas flow passageway between the boxes, be caused to move automatically from the outermost box 11 to the next inner box 12 and then to the innermost box 13 by convection, with the gaseous medium being heated to successively higher temperatures as it passes through said several boxes in succession.

Each of boxes 11–13 includes one or more black body elements provided to store heat energy from the incoming solar radiation 14 so that, as the gaseous medium passes said black body elements it picks up heat energy from said black body elements as well as from radiant energy 14 itself. In the form shown in FIG. 1, the black body elements comprise a plurality of baffle plates 15 in each box, constructed for example of metal having an appropriate black coating thereon, and mounted at their lower end for pivotal movement through arcs designated by arrows 15a to permit the several plates 15 in each box to be oriented in a direction substantially at right angles to incoming solar radiation 14. The orientation of the several plates 15 can be adjusted by simple mechanical means, either by hand or by an appropriate vane controller 15b which is connected to the several plates or vanes 15 (only one such vane has been shown interconnected to controller 15c in FIG. 1 to simplify the drawing). The vane controller can comprise, for example, an appropriate clock mechanism or other turning mechanism of known type.

The lower end of box 11 defines a gas inlet 16 for the admission of air (or an alternative gas such as carbon dioxide) from conduit 17, or from an optional reserve tank 18 (to be described). The gaseous medium entering box 11 at inlet 16 flows in an upward direction along the path indicated by the arrows in box 11, past blackened plates 15 and thence through the region between superposed transparent covers 11d, 12d to the top of box 11. During this flow, the gaseous medium is heated both by direct exposure to the sun's rays entering through cover 11d and by the adsorption of heat energy from plates 15. After the gaseous medium reaches the top of box 11, it proceeds out of the box through an outlet located at the upper end of the box between upper end walls 11c and 12c of boxes 11, 12 and then passes through a channel 19 extending the length of box 12, and located between the opaque bottoms of boxes 11, 12, to an inlet 21 at the lower end of box 12. The gaseous medium entering box 12 through said inlet 21 then flows along a similar path in box 12, past the blackened plates 15 therein and through the region between transparent covers 12d, 13d to the back of box 12 whence it exits through an outlet defined between the upper end walls 12c, 13c, passes through a channel 22 extending the length of box 13 between bottoms 12a, 13a at boxes 12, 13 enters box 13 through the inlet at its lower end and then passes across plates 15 in box 13 and around the exterior of boiler 20 to exit from box 13 via outlet 23. The bottoms of boxes 12 and 13 are provided with aluminum foil coatings to prevent the air which passes through channels 19 and 22 from receiving heat from the inside of the boxes through their respective bottom walls. Due to the fact that the air is flowing by convection, such heat transfer to channels 19 and 22 from the interiors of boxes 12 and 13 would tend to balance some of the convection current if the air was heated as it passed through channels 19 and 22.

Heat absorber 20 located within innermost box 13, can take the form of a flat metal container, filled with water via a water inlet line 20a, and acting as a steam boiler to produce steam at outlet line 20b. The heat absorber or boiler 20 is preferably provided with a blackened surface, and also has a finned exterior to facilitate absorption of heat from the gaseous medium flowing past the exterior of the boiler 20 (the fins are not shown in the drawing for the sake of simplicity). The water supplied to boiler inlet 20a may be taken from a preheater 24 through which gas outlet line 25, connected to outlet 23 of box 13, is connected. The gaseous medium flowing over boiler 20 loses some of its heat in converting the water in boiler 20 to steam, and loses additional heat in preheater 24 while simultaneously increasing the feed water temperature supplied to boiler 20, thereby to effect a comparatively efficient conversion of the heat in the flowing gaseous medium to energy in the form of steam at outlet line 20b.

The gaseous medium emerging from the outlet of innermost box 13 is returned to inlet 16 of outermost box 11 by a finned conduit 26 which interconnects gas flow lines 25 and 17 as illustrated. The fins on conduit 26 cool the gaseous medium flowing to line 17 thereby providing a thermal head in the system and speeding up the convection process. The returning gaseous medium need not be cooled to ambient temperature, however, and its temperature at the time it is supplied to inlet 16 of box 11 may be higher than that of the surrounding air, resulting in a higher temperature ultimately at heat absorber 20 than would be the case if the return air were cooled to ambient temperature.

Box 11, for example adjacent its lower end wall 11b, is provided with a pair of spring bias pressure valves 27, 28 of the flap valve or other type, to maintain the pressure within the solar heater at substantially ambient pressure outside of the heater, thereby to compensate for the significant pressure changes which would occur due to the heating of the gaseous medium flowing through the heater unit. This aspect of the invention has been discussed earlier. The valves 27, 28 are normally closed and are oppositely poled to permit air or gas admission to enter or exit from the solar heater in dependence upon the comparative pressures inside and outside of the heater. Valves of this type may be located at any appropriate place in the solar heater or gas flow lines, and such valves may be replaced by or supplemented by other types of pressure compensating means, e.g., a bellows adapted to expand or contract to compensate for corresponding volumetric changes in the gaseous medium. Such a bellows is shown at 30 in the embodiment of FIG. 2.

The use of air as the gaseous medium in the solar heater is optional and, if desired, a different gas having a higher specific heat, e.g., carbon dioxide, may be used instead. If this alternative arrangement is to be employed, the pressure valve 27, 28 should open to a reserve gas tank. Such a tank has been designated, in broken lines at 18 in FIG. 1. Carbon dioxide picks up and carries heat to the boilers more efficiently than air, but necessitates the use of an optional reserve tank which, of course, increases the cost of the unit.

The arrangement described in FIG. 1 accomplishes significant increase in the temperature of the gaseous medium by causing the same air or gas to circulate continuously from an outermost container to an inwardly disposed container and thence to a still further inwardly disposed container, with the air receiving additional increments of heat as it passes in succession over the baffle plates of the successive different containers. However it will be appreciated that, while the solar radiation 14 passes through only a single transparent cover to reach baffle plate 15 in container 11, it must pass through two such transparent covers before reaching baffle plates in container 12, and through three transparent covers before reaching the baffle plates in container 13, and the provision of still further containers in the nested arrangement would similarly increase the number of transparent covers or glass sheets through which radiant energy must pass. Inasmuch as the light transmitting efficiency of glass is only about 90% each glass or transparent cover will decrease the energy to which the baffle plates are subjected by about 10%. It will be appreciated, therefore, that the number of containers employed in nested relation to one another cannot be increased indefinitely since the law of diminishing returns applies.

To overcome this limitation, a plurality of nested units of the general type shown in FIG. 1 can be connected in series with one another with the heated gaseous medium emerging from the innermost container of one group of nested containers being supplied to the outermost container of a further group of similarly nested containers, etc. Such an arrangement is shown in FIG. 2.

Figure 2:
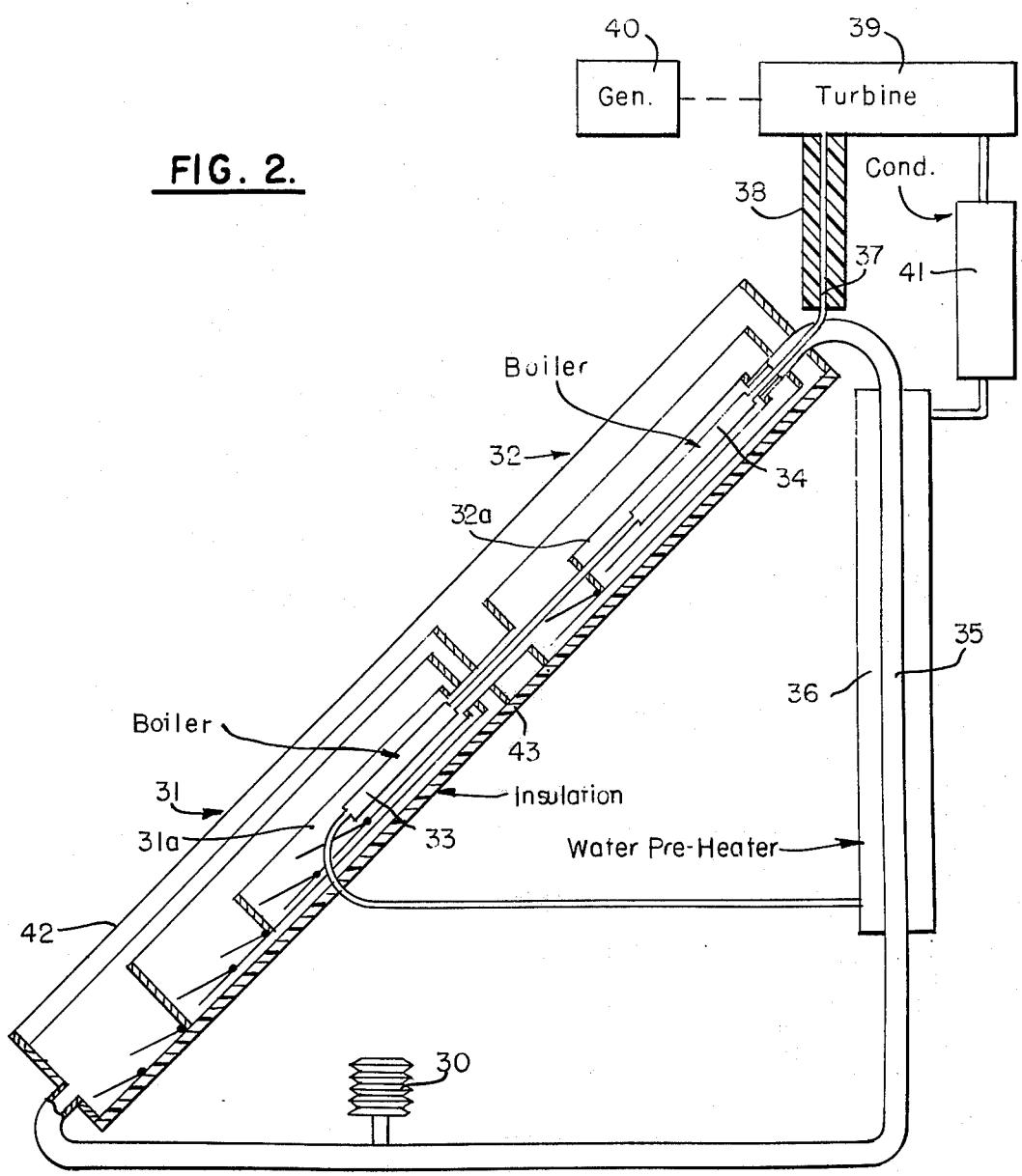
FIG. 2 is a cross-sectional diagrammatic view of a further embodiment of the invention employing series-connected heating units of the type shown in FIG. 1.

The FIG. 2 arrangement comprises two groups 31, 32 of nested containers with each group being constructed in accordance with the considerations already discussed in reference to FIG. 1. The gaseous medium which eventually flows through innermost container 31a of group 31 passes across the exterior of a boiler 33 and then emerges from the outlet of said innermost container 31a and passes to the inlet of the outermost container in group 32. It thereafter passes through the nested containers of group 32 in a fashion similar to that described in reference to FIG. 1 eventually reaching innermost container 32a of group 32, passing across the exterior of boiler 34 and emerging at the outlet of said innermost container 32a for passage through a return line 35 back to the inlet of the outermost container of group 31. The air or gas movement through the nested containers of group 31 and thereafter through the nested containers of group 32 is effected entirely by convection, and the heated air emerging from innermost container 32a may, in a fashion similar to that described in reference to FIG. 1, pass through a water preheater 36 which supplies water to boilers 33 and 34 connected in series with one another.

The arrangement thus provided in FIG. 2 preheats the feed water in preheater 36, further heats the water in boiler 33, and then supplies the feed water to boiler 34 where it is converted to steam which exits through an outlet line 37 which is insulated as at 38. The steam thus generated may be used in any desired fashion, e.g., it may be employed to operate a steam heated air conditioner of the type which presently uses a gas flame to generate the steam needed for its operation.

Alternatively, the steam in line 37 can be supplied to utilization equipment such as a steam turbine 39 which drives an electrical generator 40. When this latter type of utilization equipment is employed, the steam, after passing through turbine 39, can be fed to a condenser 41 which converts the steam to water and supplies it to preheater 36 for resupply to boilers 33 and 34. The elements 39–41 should preferably be located at a position above the solar heating unit to permit the feed water to be supplied to the boilers in said unit by gravity, but the water supply may be pumped if such an arrangement is not convenient.

In the arrangement of FIG. 2, the various glass cover plates of the several nested containers are superposed by an additional glass plate 42 to provide extra protection due to the fact that the entire solar heating unit is normally located outside of the building or residence with which it is associated and is subjected to various weather conditions. For the same reason, all of the exterior surfaces of the solar heater are preferably covered by insulation such as that designated 43 in FIG. 2. Similar considerations apply to the arrangement shown in FIG. 1.

While I have thus described preferred embodiments of the present invention, many variations will be apparent to those skilled in the art and it must therefore be understood that the foregoing description is intended to be illustrative only and not limitative of the present invention. All such variations and modifications as are in accord with the principles described are meant to fall within the scope of the appended claims.

Having thus described my invention, I claim:

1. A solar heater comprising a plurality of elongated containers nested one within the other, each of said containers having a transparent upper surface, the transparent upper surfaces of said containers being superposed and positioned to admit solar radiation to each of said containers, each of said containers including an inlet adjacent one end thereof for a gaseous medium to be heated within said container by solar radiation, each of said containers also including an outlet for the heated gaseous medium adjacent its other end, means defining a plurality of gas flow passageways connecting the outlet of each of said containers to the inlet of the next inner one of said containers and connecting the outlet of the innermost one of said containers to the inlet of the outermost one of said containers whereby said gaseous medium flows continuously to and through each of said nested containers successively to cause said gaseous medium to be heated to successively higher temperatures as it flows from one end to the other of each of said successively inwardly disposed containers, and heat utilization means within the innermost one of said containers responsive to the heated gaseous medium flowing through said innermost container.

2. The heater of claim 1 wherein said heat utilization means comprises receptacle means within the innermost one of said containers containing a quantity of liquid which is heated by said flowing gaseous medium as said medium flows through said innermost container.

3. The heater of claim 1 including pressure responsive valve means connected to said heater for maintaining the pressure of said gaseous medium substantially at a predetermined value as said medium is heated to successively higher temperatures.

4. The solar heater of claim 1 wherein said gaseous medium is air which flows continuously to and through said nested containers successively by convection.

5. The solar heater of claim 1 including a tank containing said gaseous medium, and valve means connecting said tank to said heater to supply the gaseous medium which flows through said heater.

6. The solar heater of claim 5 wherein said gaseous medium is carbon dioxide.

7. The solar heater of claim 2 wherein said liquid is water.

8. The solar heater of claim 7 wherein said receptacle means comprises a boiler having a water inlet and a steam outlet, and water supply means connected to said water inlet, said water supply means including a water preheater, the gas flow passageways connecting the outlet of the innermost one of said containers to the inlet of the outermost one of said containers passing through said preheater to preheat the water being supplied to said boiler inlet.

9. The solar heater of claim 1 wherein each of said containers includes an opaque bottom, said opaque bottoms being superposed, the gas flow passageway connecting the outlet of each of said containers to the inlet of the next inner one of said containers extending between the superposed bottoms of said containers.

10. The solar heater of claim 9 wherein the opaque bottom of said next inner one of said containers includes a heat reflective surface operative to inhibit the transfer of heat from each container to the gas flow passageway below the bottom of that container.

11. The solar heater of claim 1 including black body means in each of said containers exposed to said solar radiation to be heated thereby and disposed in the path of gaseous medium flow through said container for heating said flowing medium.

12. The solar heater of claim 11 wherein said black body means comprises a plurality of blackened vanes mounted for pivotal movement within each of said containers, and means for controlling the angular orientation of said vanes about their respective pivots relative to the direction of said solar radiation.

13. The solar heater of claim 1 comprising plural groups of said nested containers, the inlets and outlets of the containers in each group being interconnected by said gas flow passageways to cause said gaseous medium to flow continuously from the outermost container to the innermost container in each group, said gas flow passageways also connecting said groups in series by connecting the outlet of the innermost container in a first one of said groups to the inlet of the outermost container in a next one of said groups and connecting the outlet of the innermost container of a group other than said first group to the inlet of the outermost container of said first group, whereby said gaseous medium is heated to successively higher temperatures as it flows continuously from each container to the next inner container in each group and thence to another one of said groups for further heating as it flows from one container to the next inner container in said other group.

14. The solar heater of claim 13 wherein the innermost container of each group has a boiler therein containing water, the boiler in each group having an outlet which is connected to an inlet of the boiler in the next one of said groups.

15. The solar heater of claim 14 wherein said plural groups constitute two groups of said nested containers.

16. The solar heater of claim 15 wherein the boiler outlet of the second one of said groups is connected to a steam turbine and thence to a steam condenser the outlet of which is connected to an inlet of one of said boilers, both the steam turbine and steam condenser being located considerably higher than said boiler inlet to cause the condensate from said condenser to feed into the boiler by gravity.

17. The solar heater of claim 1 including at least one expansible bellows positioned to respond to the pressure of said flowing gaseous medium for controlling the pressure of said gaseous medium as it flows through said heater.

* * * * *